United States Patent [19]

Gelardi et al.

[11] Patent Number: 5,026,000
[45] Date of Patent: Jun. 25, 1991

[54] VIDEO CASSETTE INTEGRAL DUST DOOR LATCH/SPRING

[75] Inventors: Anthony L. Gelardi, Cape Porpoise; Craig Lovecky, Old Orchard Beach, both of Me.

[73] Assignee: Shape Inc., Biddeford, Me.

[21] Appl. No.: 389,401

[22] Filed: Aug. 4, 1989

[51] Int. Cl.⁵ ............................................. G11B 23/04
[52] U.S. Cl. .................................................. 242/199
[58] Field of Search .............. 242/197, 198, 199, 200; 360/132

[56] References Cited

U.S. PATENT DOCUMENTS

| | | | |
|---|---|---|---|
| 3,661,250 | 5/1972 | Lyman | 206/52 F |
| 3,735,939 | 5/1973 | Inaga | 242/198 |
| 3,809,219 | 5/1974 | Esashi | 220/55 K |
| 4,022,395 | 5/1977 | Kishi | 242/198 |
| 4,180,220 | 12/1979 | Shiba et al. | 242/199 |
| 4,212,437 | 7/1980 | Shiba et al. | 242/199 |
| 4,214,719 | 7/1980 | Kato | 242/198 |
| 4,323,207 | 4/1982 | Gebeke | 242/198 |
| 4,358,070 | 11/1982 | Okamura et al. | 242/197 |
| 4,389,690 | 6/1983 | Oishi et al. | 360/132 |
| 4,399,480 | 8/1983 | Edwards | 360/132 |
| 4,418,373 | 11/1983 | Fujimori et al. | 360/132 |
| 4,436,201 | 3/1984 | Inaba | 206/444 |
| 4,466,583 | 8/1984 | Giannis et al. | 242/198 |
| 4,475,700 | 10/1984 | MacLeod, Jr. et al. | 242/197 |
| 4,527,755 | 7/1985 | Rood et al. | 242/199 |
| 4,697,702 | 10/1987 | Urayama | 242/199 |
| 4,712,150 | 12/1987 | Pertzsch et al. | 360/132 |
| 4,723,179 | 2/1988 | Posso | 360/132 |
| 4,727,445 | 2/1988 | Satoh et al. | 360/132 |
| 4,737,875 | 4/1988 | Shiba et al. | 360/132 |
| 4,738,361 | 4/1988 | Ackeret | 206/307 |
| 4,744,530 | 5/1988 | Cybulski et al. | 242/198 |
| 4,747,563 | 5/1988 | Sasaki et al. | 242/199 |
| 4,780,783 | 10/1988 | Osawa et al. | 360/132 |
| 4,786,012 | 11/1988 | Ino et al. | 242/198 |
| 4,791,504 | 12/1988 | Igarashi et al. | 360/132 |
| 4,824,044 | 4/1989 | Oogi | 242/198 |

FOREIGN PATENT DOCUMENTS

| | | | |
|---|---|---|---|
| 0162487 | 11/1985 | European Pat. Off. | 360/132 |
| 60-113384 | 6/1985 | Japan | 360/132 |
| 1149668 | 4/1969 | United Kingdom . | |
| 1272684 | 5/1972 | United Kingdom . | |
| 1411967 | 10/1975 | United Kingdom . | |

Primary Examiner—Daniel P. Stodola
Assistant Examiner—William G. Battista, Jr.
Attorney, Agent, or Firm—Staas & Halsey

[57] ABSTRACT

An integrally molded dust door latch/spring for a video cassette and related method of assembly are described. The latch/spring includes: a planar latch body having a flexing member formed between a first upper end and a second lower end. The first end includes two lateral supports and a projecting, substantially planar perpendicular member. The second end includes first and second projections which enter openings formed in the cassette base. The latch/spring is assembled in the cassette such that the first end is fixed between the cassette base and cover, but the second end can flex or deflect via the flexing member relative to the first end. The method includes the steps of: (1) locating the two projections in the openings formed in the cassette base; (2) locating the supports in receptacles formed in the base; and (3) placing the cassette cover on the base so that the first end of the latch body is fixed relative to the cassette and the first end can flex relative to the first end via the flexing member.

16 Claims, 4 Drawing Sheets

VIDEO CASSETTE INTEGRAL DUST DOOR LATCH/SPRING

BACKGROUND OF THE INVENTION

This invention relates to a tape cassette and, more particularly, to a video cassette dust door latch having an integral spring.

For convenience of reference, when describing the tape cassette of the prior art and the present invention, "inward" means in a direction toward to the interior of the cassette from its sides, "outward" means in a direction toward the sides of the cassette from the interior, "upward" means in a direction toward the cassette cover from the cassette base, and "downward" means in a direction toward the base from the cover.

A conventional tape cassette usually has a flat, substantially rectangular, configuration which may be formed of a suitable plastic, and includes a cassette cover and base, each having side walls. Tape reels are usually suitably located in side-by-side relation within the cassette so as to be freely rotatable, and a magnetic tape is wound between the tape reels.

Such cassettes also usually include a hinged dust door and a biased latch for temporarily locking the dust door closed. The dust door protects the tape in the cassette from dust, abrasion, etc., when the cassette is not being used in a tape player/recorder, e.g., during transport and storage.

Conventionally, the latch has been made in the form of a substantially flat, rectangular latch body, pivotably supported by lateral pivot pins which rest in the cassette base. The latch body is urged outwardly by a spring attached to the latch body and abutting a wall of the cassette. First and second projections on the outward side surface of the latch body extend through corresponding openings formed in the side wall of the cassette base. The first projection engages an opening in the side of the dust door when the door is in a closed position, thereby locking the door. The second projection is exposed on the outside of the tape cassette, adjacent one end of the dust door, to allow access by a movable pin on the tape player/recorder when the tape cassette is inserted into the tape player/recorder. The second projection is automatically depressed by the pin, the latch pivots, releasing the first projection from engagement with the dust door, and the dust door is allowed to open to expose the tape for use in the tape player/recorder.

One type of spring conventionally used to bias the latch is a separate, coil spring connected to the latch body, as described in Assignee's U.S. Pat. No. 4,475,700. The drawbacks associated with this type of latch/spring assembly are the cost associated with manufacturing and assembling multiple parts and the difficulty of handling, attaching and pre-loading the coil spring. The present invention is not directed to this type of separate spring, but is directed to a type wherein the spring is formed integrally of the latch.

Integral springs for dust door latches are known. More particularly, as described in Gebeke U.S. Pat. No. 4,323,207, a latch includes an integral spring in the form of a "U" or "S"-shaped polymeric material extending from a rigid body portion slidably mounted in a housing of the cassette body. However, this structure is sensitive to precise molding and interior wall location, and is also vulnerable to storing and shipping damage.

On the other hand, Giannis et al. U.S. Pat. No. 4,466,583, discloses, as shown in FIG. 1 herein, a dust door latch generally designated by element 10. The latch 10 is mounted for rotational movement about a substantially horizontal axis "a" between a latching position at which the latch 10 locks the dust door (not shown) in its closed position, and an unlatching position in which the dust door is unlatched for opening. The rotational movement is provided by a pair of well-known, rounded pivot pins 12 and 14. Pivot pin 12 rests in a rounded notch 16 in a forward wall 18 of the cassette base 20. The other pivot pin 14 rests in another rounded notch 22 on the top of an interior wall 24 which extends upwardly from the bottom wall 26 of the cassette base 20. The usual operable projections described above (not shown) extend outwardly from the latch 10 through openings (one shown at 36) formed in the cassette base 20 side wall 38. The cassette base also includes a conventional light hole 40.

An elongated resilient arm 28 is formed on the latch 10 to extend downwardly toward the interior of the cassette base 20 and in the direction of rotation of the latch 10 toward its unlatched position. Arm 28 is attached at one end 30 to the latch 10 in an integral, one-piece relationship. The opposite end 32 of arm 28 is biased against an inner wall 34 of the cassette base 20 for urging the latch 10 toward its latching position.

The drawbacks associated with this conventional, integral dust door latch/spring 10 are that: (a) it is costly to produce since the arm 28 must be carefully molded to ensure proper installation and retention of its biasing ability over time and under different temperature conditions; (b) assembly of this small part is difficult due to the need to hold the arm 28 in during assembly to prevent obstruction with the wall 34 and to properly preload the spring 28 in the cassette base 20 against the wall 34; and (c) the pivot pins 12, 14 must be accurately molded and received by the notches 16, 22 or else the latch 10 will not pivot as required, and the dust door will not open.

Further, as with any mass-produced, consumer item such as video cassettes, there is always a desire to eliminate parts and assembly steps to decrease overall cost.

Although the prior art described above eliminates some of the problems inherent in the tape cassette door latch art, the prior art still does not teach a biased door latch capable of the most cost efficient production nor the most time efficient automated assembly.

SUMMARY OF THE INVENTION

Accordingly, it is a purpose of the present invention to provide a tape cassette which can be made for less cost than conventional tape cassettes.

It is another purpose of the present invention to provide an integral dust door latch/spring for a video cassette which is capable of more cost-efficient production than the prior art.

It is another purpose of the present invention to provide an integral dust door latch/spring capable of being automatically assembled into a cassette by a quick and easy method.

It is another purpose of the present invention to provide an integral dust door latch/spring in which the spring is integrally molded as part of the latch body, but does not extend therefrom.

It is another purpose of the present invention to provide an integral dust door latch that does not have to be preloaded during assembly.

Finally, it is a purpose of the present invention to provide a method for facilitating assembly of a dust door latch into a tape cassette.

To achieve the foregoing and other purposes of the invention, and in accordance with the purposes of the invention, there is provided both an improved, integral dust door latch/spring device for a video cassette and a method for assembling same into the video cassette.

The device includes: a normally planar latch body having a first upper end, a second lower end and a relatively thin horizontal portion or "flexing member" formed about midway therebetween.

The first end includes two lateral, flat sided supports and a projecting, substantially planar, perpendicular member on one side. The second end includes first and second projections, which enter openings formed in the cassette base, the first projection being exposed and the second being capable of locking the dust door. The second end can flex, via the flexing member, relative to the first end, which is fixed between the cassette cover and base.

The method includes the steps of: (1) locating the first and second projections in the openings formed in the cassette base; (2) locating the lateral supports in receptacles formed in the base; and (3) placing a cassette cover onto the base so that the first end of the latch body is held in a fixed position therebetween, and the second end is able to flex relative to the first end via the flexing member.

During operation, a pin of the tape player/recorder presses inwardly and upwardly against the first projection. Since the first and second ends are separated by the flexing member, and since the first end is effectively fixed between the cassette base and cover, the second end deflects or flexes inwardly relative to the first end under the pressure. As a result, the second projection leaves engagement with a corresponding receptacle formed on the dust door, allowing the dust door to bias open, whereby the tape player/recorder can gain access to the tape. When operation of the tape ends, the tape player/recorder releases pressure on the first projection and the second end flexes back to its original position coplanar with the first end under the biasing influence of the flexing member, and the second projection locks the dust door.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments according to the present invention will now be described with reference to FIGS. 2-9.

The present invention basically includes an integral dust door latch/spring designated generally by reference number 80, which is received between a cassette cover 50 and cassette base 52.

Figure 2:
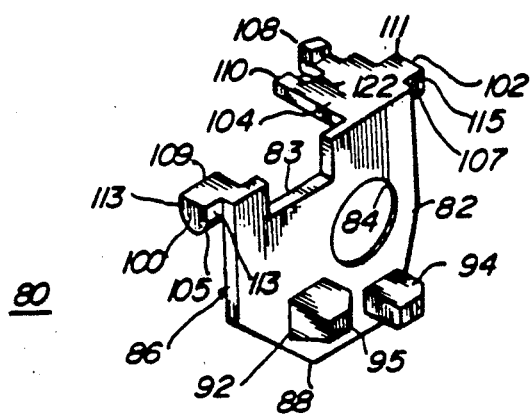
FIG. 2 is a perspective view illustrating the latch/spring according to the present invention.
Figure 3:
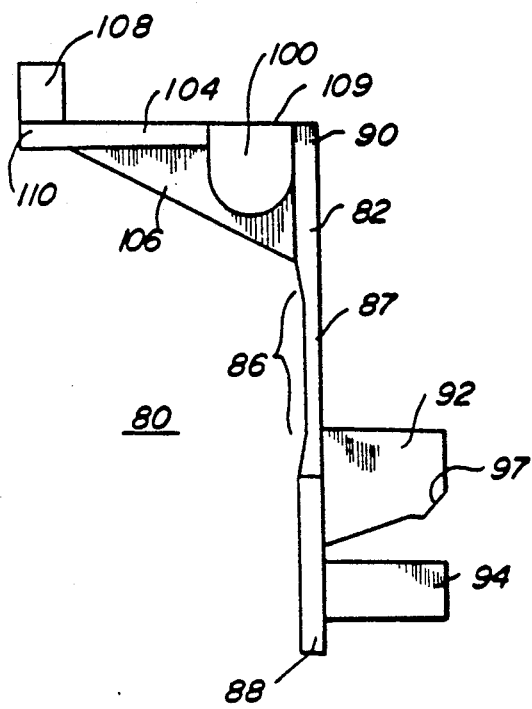
FIG. 3 is a side view illustrating the latch/spring shown in FIG. 2.
Figure 4:
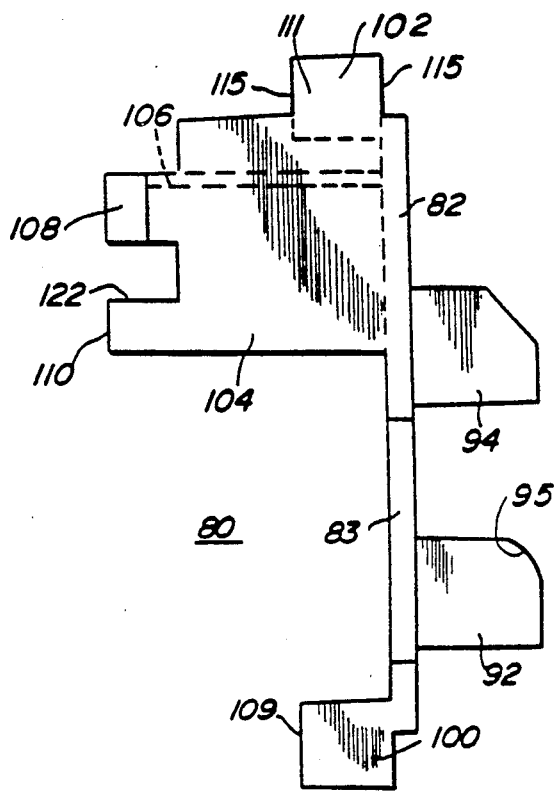
FIG. 4 is a top view illustrating the latch/spring shown in FIG. 2.

FIGS. 2-4 best illustrate the integrally molded latch/spring 80 according to the present invention. The latch/spring 80 is a one piece, preferably injection molded part, shot in a resilient material such as nylon or acetal. Nylon appears to exhibit better properties for this invention than acetal. That is, the latch/spring fabricated from nylon deflects or flexes better at the very sensitive gram forces applicable.

The latch/spring 80 includes a planar body 82 having a rectangular recess 83 for allowing access to a pivot pin (not shown) of the dust door 68 and a conventional circular light hole 84. The body 82 also includes a relatively thin horizontal portion or flexing member 86 formed between a first, upper end 90 and a second, lower end 88. This flexing member 86 is the "spring" for this dust door latch.

The second end 88 includes two projections 92, 94 which enter corresponding openings discussed below, one 92 exposed and the other 94 further locking the dust door 68 via a receptacle 69 (FIG. 8) formed in the dust door 68.

As known, heat and cold cause deflection forces of plastic to differ. As a result, the temperature condition of the cassette 48 when inserted into a tape player/recorder may affect the ability of a pin 120 of the tape player/recorder to push the projection 92. As a result, chamfers or radii 95, 97 are added to the projection 92 as part of the present invention to help the tape player/recorder pin 120, which may also have a chamfered or radiused surface, locate properly and overcome retraction forces.

The first end 90 includes two lateral supports 100, 102 and a projecting substantially planar, perpendicular member 104. Extending across the angle between the latch body 82 and the perpendicular member 104 is a gusset 106 which adds stiffness therebetween. Further, a generally triangular shaped protuberance 108 projects from a free end 110 of the perpendicular member 104 in a direction away from the second end 88 of the body 82 and perpendicular to the body 82. Finally, a square shaped recess 122 is formed adjacent the triangular protuberance 108.

Figure 5:
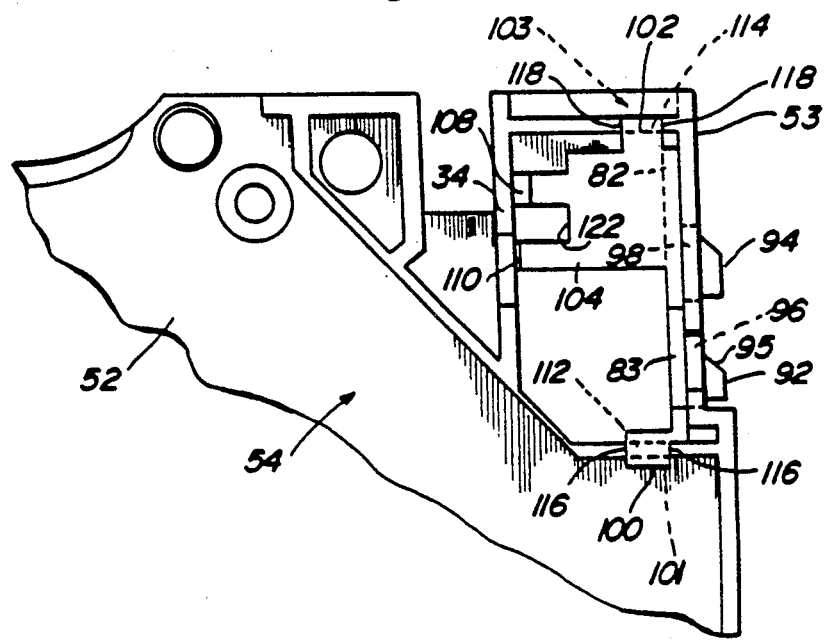
FIG. 5 is a plan view illustrating an area of the tape cassette base which receives the latch/spring according to the present invention.

FIG. 5 is a plan view of an area 54 of the base 52 which cooperates with an area 56 of the cover 50 (shown in FIG. 6) for receiving the latch/spring 80. The area 54 includes a side wall 53 having an opening 55 (FIG. 7) which allows light to pass through the tape cassette 48 during use, as is well known in the art. The side wall 53 also includes openings 96 and 98 for receiving the projections 92 and 94, respectively. Receptacles 101, 103 are also formed in the base 52 to receive the supports 100, 102. An added benefit of the present invention is that the conventional cassette base structure does not need to be modified to receive the latch/spring 80 of the invention.

Figure 6:
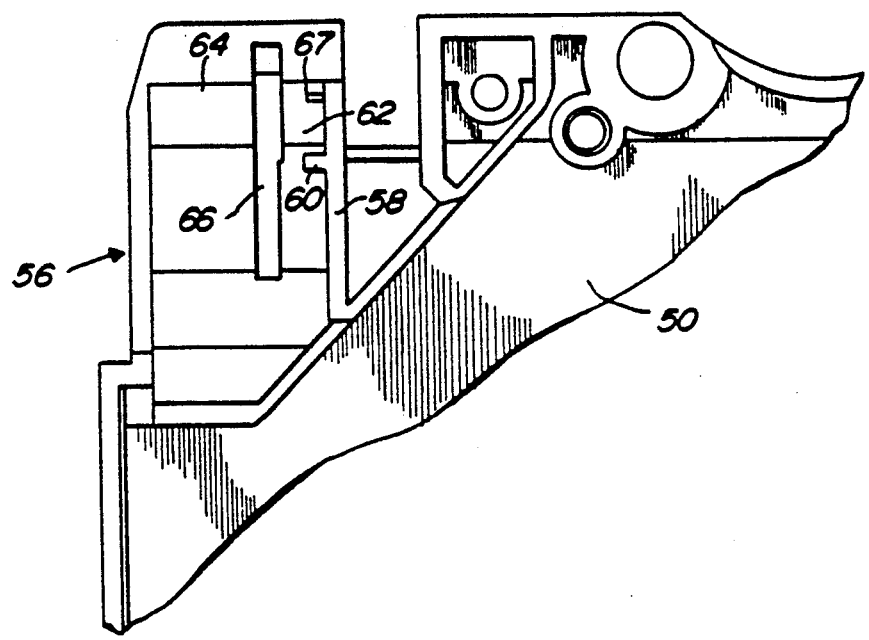
FIG. 6 is a plan view illustrating an area of the tape cassette cover which receives the latch/spring according to the present invention.
Figure 7:
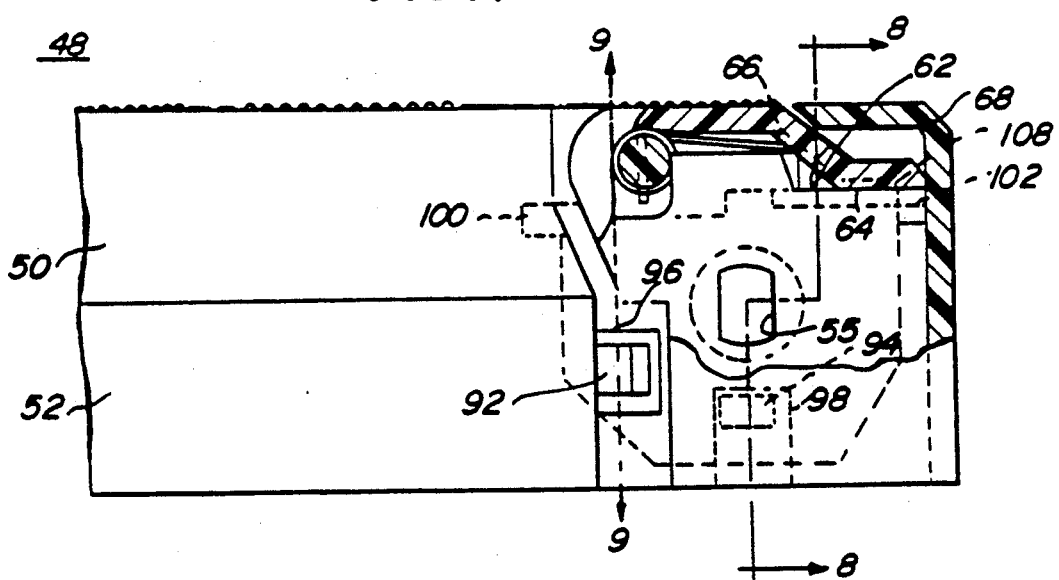
FIG. 7 is a partial cross sectional side view illustrating the latch/spring assembled in the cassette in the locked position.

Referring to FIG. 6, the area 56 includes a first wall 58, a vertical linear projection 60 and a recess 62 formed between the projection 60 and a small projecting member 63. The recess 62 is inclined as can be seen in FIG. 7. The area 56 also includes an abutting portion 64, and an indentation 66 which receives a leg of the conventional coil spring 70 of the dust door 68.

As shown in FIG. 7 the latch/spring 80 is assembled in the cassette 48 by the following method, the steps of which do not necessarily have to be followed in the order described. The latch/spring 80 is inserted downward so that the projections 92, 94 enter the openings 96, 98, respectively, formed in the cassette base 52. Then, the supports 100, 102 are located in the receptacles 101, 103 formed in the base 52.

Figure 1:
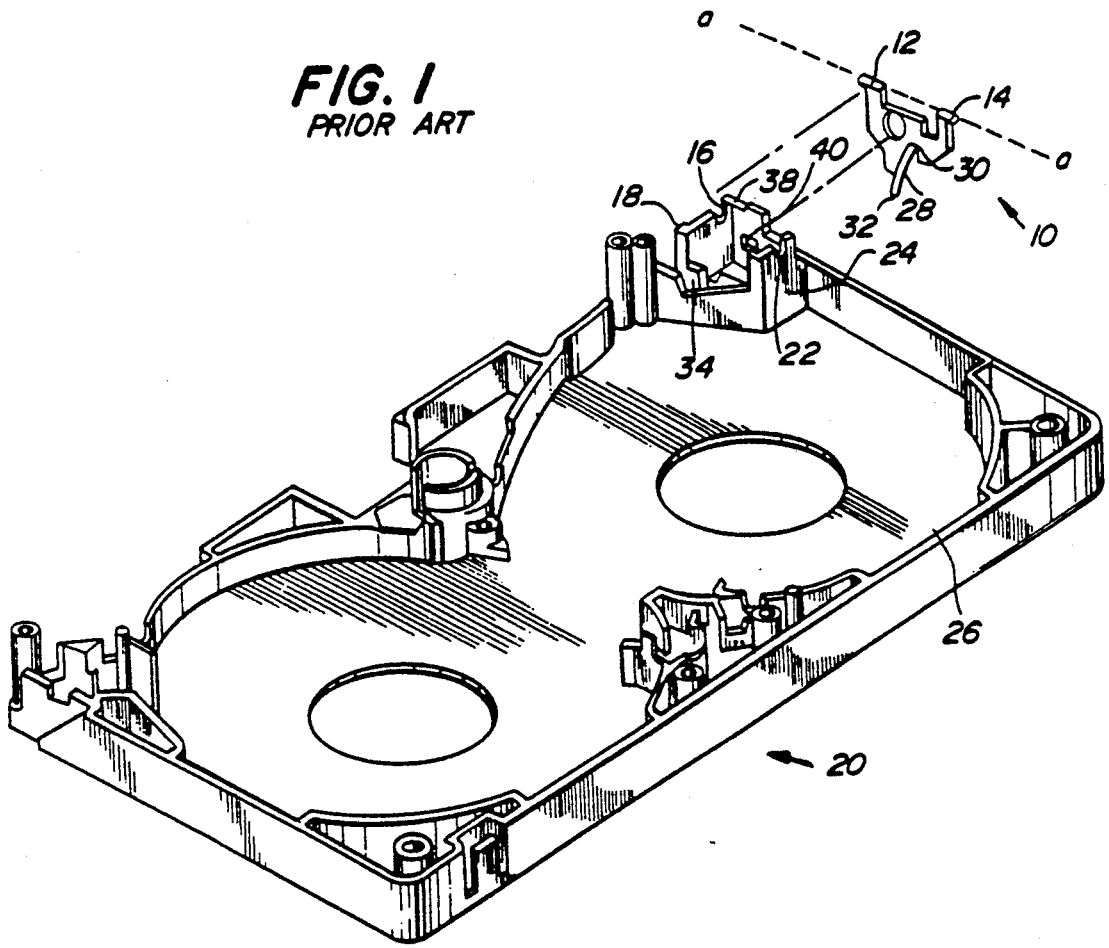
FIG. 1 is a perspective, exploded view illustrating a conventional dust door latch and a cassette base.

As can be seen, the round pivot pins 12, 14 of prior art of FIG. 1 are not used. Instead, the lateral supports 100, 102 are used, each of which includes a rounded base 105, 107 only, a flat top 109, 111, and flat sides 113, 115, respectively (FIGS. 2-4). Each receptacle 101, 103 includes a corresponding, rounded base 112, 114 and flat sides 116, 118 (FIG. 5).

The lateral supports 100, 102 are easy to load due to the rounded bases 105, 107 facilitating automated insertion into the receptacles 101, 103. However, the abutting relationship of the flat sides 113, 115 of the supports 100, 102 and the flat sides 116, 118 of the receptacles 101, 103 assist in preventing the first end 90 of the latch/spring 80 from pivoting relative to the cassette base 52.

Figure 8:
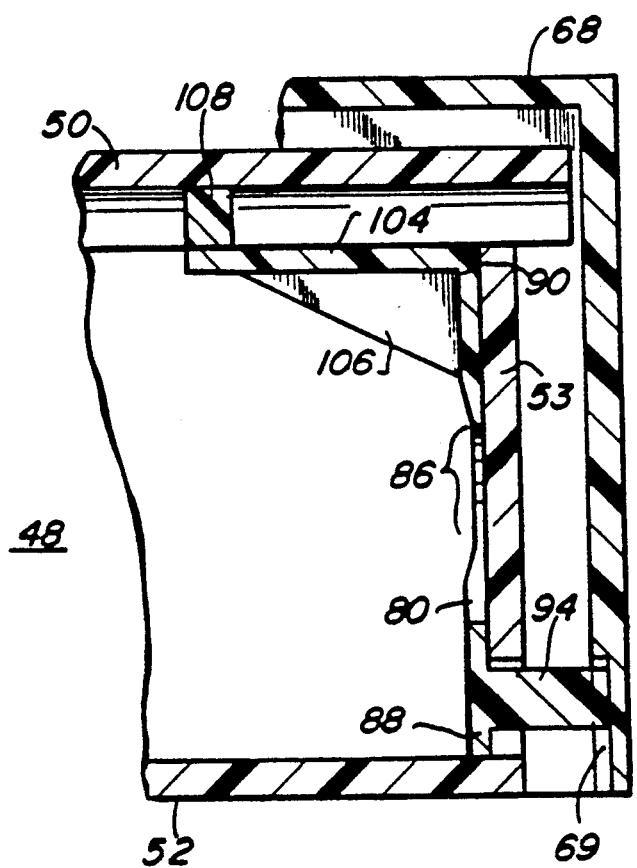
FIG. 8 is a side, cross-sectional view taken along line 8—8 of FIG. 7.

The cassette cover 50 is then located on the base 52 so that: the linear, vertical projection 60 formed on the cover 50 enters the square shaped recess 122 of the body 82; the adjacent triangular shaped protuberance 108 of the latch/spring 80 mates with the corresponding recess 62 on the cover 50; and the planar perpendicular member 104 of the latch/spring 80 abuts the abutting portion 64 of the cover 50. FIG. 8 is a side view of the latch/spring 80 in the tape cassette in the "locked" (vertical planar) position.

These combinations, as well as the receipt of the lateral supports 100, 102 in the receptacles 101, 103 described above serve, in direct contrast to the conventional latch 10, to fix substantially the first end 90 of the latch/spring 80 in the cassette 48. By "substantially" it is meant that for all intents and purposes the first end 90 of the body 82 does not move, but some minor shift or movement of course will occur due to assembly tolerances.

The above description indicates that it is a cooperation between the base 52 and cover 50 which fixes the first end 90 of the latch/spring 80. Of course, as would be understood by one of ordinary skill, there are alternate ways to fix the first end 90 relative to the cassette 48 without using both the base 52 and cover 50. The main consideration is fixing the first end 90 so that the second end 88 can flex relative thereto.

As can be seen, no separate spring is biased against the cassette base 52 in the present invention. Instead, the flexing member 86 merely acts as the spring between the first, fixed end 90 and the second movable end 88.

Figure 9:
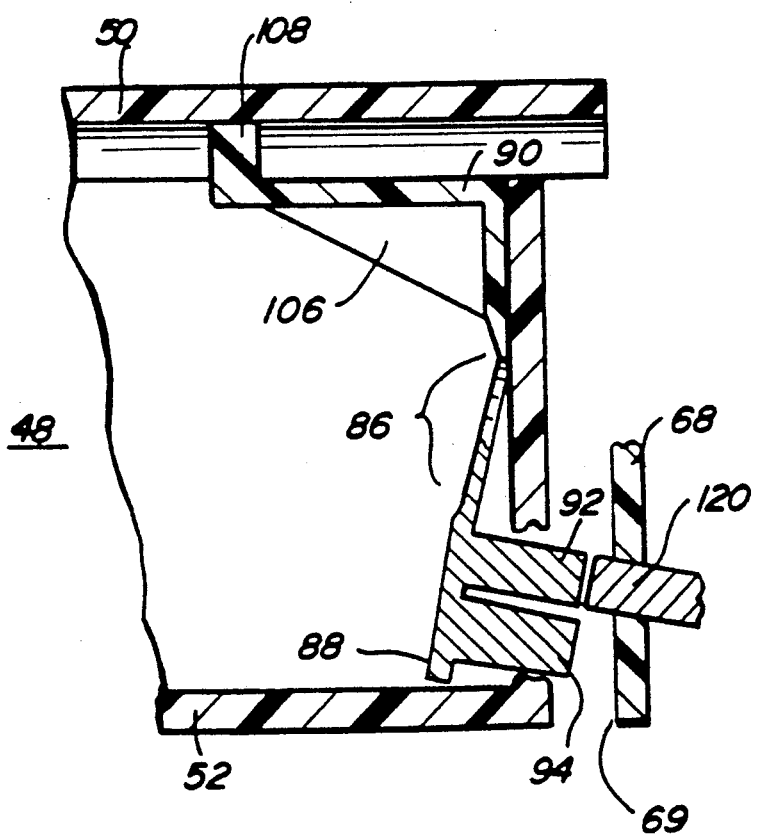
FIG. 9 is a partial, cross sectional, side view illustrating the latch in the "unlocked" position.

As shown in FIG. 9, during operation the pin 120 of the tape player/recorder presses inward against the exposed projection 92, as known in the art. Since the first end 90 and second end 88 of the latch/spring 80 are separated by the flexing member 86, and since the first end 90 is effectively fixed between the base 52 and cover 50, the second end 88 flexes or deflects inwardly relative to the first end 90 under pressure. As a result, the second projection 94, leaves engagement with the corresponding receptacle 69 on the dust door 68, allowing the dust door 68 to bias open via the spring 70, whereby the tape player/recorder can gain access to the tape.

When operation of the tape ends, the video recorder releases pressure on the projection 92 and the second end 88 flexes back to its original position co-planar with the first end 90 under the biasing influence of the flexing member 86.

By using the flexing member 86, the present invention eliminates the need for the separate extension arm 28 of the prior art latch 10 which has several significant advantages discussed below.

Less assembly time is required over that of the prior art since the latch/spring 80 is more easily installed in the cassette base 52. Most particularly, the latch/spring 80 of the present invention need not be held in to prevent obstruction, or pre-loaded, like the springs of conventional latches. For example, no separate projecting spring arm must be accurately biased against a cassette base wall in order to have the latch operate. Further, the latch 80 is not sensitive to precise interior wall location.

The latch/spring 80 of the present invention also has the advantage that it is less vulnerable to storage and shipping damage than prior art devices since it is held between the cassette base and cover; there is less chance that the latch/spring 80 will become "unloaded" or dislodged during shipping, handling, etc.

The present invention is also more compact and therefore requires less space than prior art dust door latches. Also, production costs are reduced since less materials are used: the separate, projecting, spring arm is eliminated and the latch body is made thinner at the flexing member. Further in this regard, if a defect is found in the latch/spring 80 after installation, it can easily be removed, melted down and reused. Overall, product yield is significantly increased.

It can be seen from the above description that the present invention provides an improved integral dust door latch/spring for a video cassette using fewer parts, allowing easier automatic assembly method of the latch/spring in the cassette, and using an assembly method with fewer steps than known in the prior art, thus effecting more time and cost-efficient manufacture and production.

The above-described dust door latch, and method of assembly therefore, have been shown to be of the type intended for use in video tape players/recorders. However, the invention can be similarly applied to tape cassettes for use in audio or other recording and/or reproducing apparatus.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What we claim is:

1. An integral dust door latch/spring capable of being received within a tape cassette base and cover for latching and unlatching a dust door, comprising:
   a substantially rectangular, planar latch body formed separate from the cover and base of a first thickness, and having;
   (a) a first longitudinal end including two lateral supports and being fixed against movement by being abutted by the base and cover;
   (b) a second, longitudinal opposite end; and
   (c) means, formed of a second, lesser thickness integrally and coplanar to the plane of the latch body substantially midway and longitudinally between the first and the second ends for allowing the second end to flex relative to the first end between a first dust door latching position and a second dust door unlatching position,
   wherein the second end includes;
   (i) a first projection which is abutted to flex the second end relative to the first end, and
   (ii) a second projection used to removably latch the dust door.

2. The latch/spring as recited in claim 1, wherein the first projection has at least one radiused surface.

3. The latch/spring as recited in claim 1 injection molded of nylon.

4. The latch/spring as recited in claim 1 injection molded of acetal.

5. An integral dust door latch/spring capable of being received within a tape cassette base and cover for latching and unlatching a dust door, comprising:
   a substantially planar latch body having;
   (a) a first end including means for fixing the first end against movement relative to the base and cover
   wherein the fixing means includes;
   (1) two lateral supports for non-movably supporting the first end in the cassette base; and
   (2) a substantially planar member projecting from the first end perpendicular to the plane of the latch body for abutting the cassette cover;
   (b) a second, opposite end; and
   (c) means, formed integrally and coplanar to the plane of the latch body between the first and the second ends for allowing the second end to flex relative to the first end between a first dust door latching position and a second dust door unlatching position.

6. An integral dust door latch/spring capable of being received within a tape cassette base and cover, comprising:
   a latch body having;
   (a) a first end including means capable of fixing the first end relative to the base and cover;
   wherein the fixing means includes
   (i) two lateral supports for non-pivotably supporting the first end in the cassette base; and
   (ii) a substantially planar, member projecting from the first end perpendicular to the plane of the latch body for abutting the cassette cover;
   (b) a second, opposite end;
   (c) means, formed integrally between the first and the second ends, for allowing the second end to flex relative to the first end;
   (d) a gusset extending between the latch body and the perpendicular member to reinforce the relative positions thereof; and
   (e) a protuberance and a recess formed on a free end of the projecting member for cooperating with a corresponding recess and projection, respectively, formed on the cassette cover.

7. A tape cassette, comprising:
   (a) a cassette base;
   (b) a cassette cover;
   (c) a biased dust door mounted on the cassette for movement between a first latched position and a second unlatched position; and
   (d) an integral dust door latch/spring formed of a first thickness separately from the cover and base and received by being abutted by the tape cassette base and cover for latching and unlatching the dust door, said latch/spring including a substantially rectangular, planar latch body having;
   (1) a first longitudinal end including two lateral supports and being fixed against movement by being abutted by the base and cover;
   (2) a second, longitudinal opposite end; and
   (3) means, formed of a second, lesser thickness integrally and coplanar to the plane of the latch body substantially midway and longitudinally between the first and the second ends, for allowing the second end to flex relative to the first end between a first dust door latching position and a second dust door unlatching position,
   wherein the second end includes;
   (i) a first projection which is abutted to flex the second end relative to the first end, and
   (ii) a second projection used to removably latch the dust door.

8. The tape cassette as recited in claim 7, wherein the latch/spring is injection molded of nylon.

9. The tape cassette as recited in claim 7, wherein the latch/spring is injection molded of acetal.

10. A tape cassette comprising:
    (a) a cassette base;
    (b) a cassette cover;
    (c) a biased dust door mounted on the cassette for movement between a first latched position and a second unlatched position; and
    (d) an integral dust door latch/spring capable of being received within the tape cassette base and cover for latching and unlatching the dust door, said latch/spring including a substantially planar latch body having;
    (1) a first end including means for fixing the first end against movement relative to the base and cover;
    wherein the fixing means comprises:
    (a) two lateral supports for non-movably supporting the first end in the cassette base; and
    (b) a substantially planar, member projecting from the first end perpendicular to the plane of the latch body for abutting the cassette cover,
    (2) a second, opposite end; and
    (3) means, formed integrally and coplanar to the plane of the latch body between the first and the second ends, for allowing the second end to flex relative to the first end between a first dust door latching position and a second dust door unlatching position.

11. A tape cassette comprising:
    (a) a cassette base;

(b) a cassette cover;
(c) a substantially planar latch body having
  (1) a first end including means for fixing the first end to the base and cover,
  (2) a second, opposite end;
  (3) means, formed integrally between the first and the second ends, for allowing the second end to flex relative to the first end,
  wherein the fixing means includes;
    (1) two lateral supports for non-pivotably supporting the first end in the cassette base, and
    (2) a projecting, substantially planar, perpendicular member for abutting the cassette cover;
(d) a gusset extending between the latch body and the perpendicular member to reinforce the relative positions thereof; and
(e) a protuberance and a recess formed on a free end of the projecting member for cooperating with a corresponding recess and projection, respectively, formed on the cassette cover.

12. A method for assembling an integral dust door latch/spring into a tape cassette, comprising the steps of:
(a) forming the cassette with a cover, a base and areas in the cover and base, respectively, for non-movably receiving the integral dust door latch/spring;
(b) forming of a first thickness a substantially rectangular, planar integral dust door latch/spring separate from the cover and base and having a first longitudinal end with two lateral supports and means for fixing the first end against movement relative to the base and cover, a second, longitudinal opposite end, and flexing means integrally and coplanar to the plane of the latch body substantially midway and longitudinally between the first and second ends and of a second, lesser thickness;
(c) locating the lateral supports and means for fixing in the areas formed in the cassette cover and base so that the first end is fixed against movement by being abutted by the cassette base and cover and the second end can flex via the flexing means relative to the first end,
wherein the second end includes;
  (i) a first projection which is abutted to flex the second end relative to the first end, and
  (ii) a second projection used to removably latch the dust door.

13. A method for assembling an integral dust door latch/spring into a tape cassette, comprising the steps of;
(a) forming the cassette with a cover, a base and first means in the cover and base, respectively, for non-movably receiving the integral dust door latch/spring;
(b) forming the integral dust door latch/spring to have a first end, a second end, flexing means therebetween and second means at the first end including flat sided supports for cooperating with the first means; and
wherein the first means includes receptacles formed in the cassette base for non-movably receiving the first end of the latch/spring,
(c) locating the latch/spring in the cassette so that the first end is non-movably fixed by the first means relative to the cassette base and cover and the second end can flex via the flexing member relative to the first end,
wherein step (c) includes the substeps of;
  (1) locating the flat sided supports formed on the latch/spring in the receptacles formed in the cassette base; and
  (2) placing the cassette cover onto the cassette base so that a linear, vertical projection formed on the cassette cover enters a square shaped recess formed on the latch/spring, a protuberance formed on the latch/spring mates with a corresponding recess formed in the cassette cover, and a planar perpendicular member formed on the latch/spring abuts an abutting portion formed on the cassette cover.

14. An integral dust door latch/spring capable of being received within a tape cassette base and cover for latching and unlatching a dust door, comprising:
a substantially planar latch body having;
(a) a first end including means for fixing the first end against movement relative to the base and cover;
(b) a second, opposite end; and
(c) means, formed integrally and coplanar to the plane of the latch body between the first and the second ends for allowing the second end to flex relative to the first end between a first dust door latching position and a second dust door unlatching position,
wherein the flexing means comprises a thinned portion formed in the substantially planar latch body.

15. A tape cassette comprising:
(a) a cassette base;
(b) a cassette cover;
(c) a biased dust door mounted on the cassette for movement between a first latched position and a second unlatched position; and
(d) an integral dust door latch/spring capable of being received within the tape cassette base and cover for latching and unlatching the dust door, said latch/spring including a substantially planar latch body having;
  (1) a first end including means for fixing the first end against movement relative to the base and cover;
  (2) a second, opposite end; and
  (3) means, formed integrally and coplanar to the plane of the latch body between the first and the second ends, for allowing the second end to flex relative to the first end between a first dust door latching position and a second dust door unlatching position,
wherein the flexing means includes a thinned portion formed in the substantially planar latch body.

16. A method for assembling an integral dust door latch/spring into a tape cassette, comprising the steps of:
(a) forming the cassette with a cover, a base and areas in the cover and base, respectively, for non-movably receiving the integral dust door latch/spring,
wherein step (a) comprises the sub-step of forming the flexing means as a thinned portion in the substantially planar latch/spring;
(b) separately forming a substantially planar integral dust door latch/spring having a first end with means for fixing the first end against movement relative to the base and cover, a second, opposite end and flexing means integrally and coplanar to the plane of the latch body between the first and second ends;
(c) locating the latch/spring in the areas formed in the cassette cover and base so that the first end is fixed against movement relative to the cassette and the second end can flex via the flexing means relative to the first end.

* * * * *